United States Patent Office 2,958,600
Patented Nov. 1, 1960

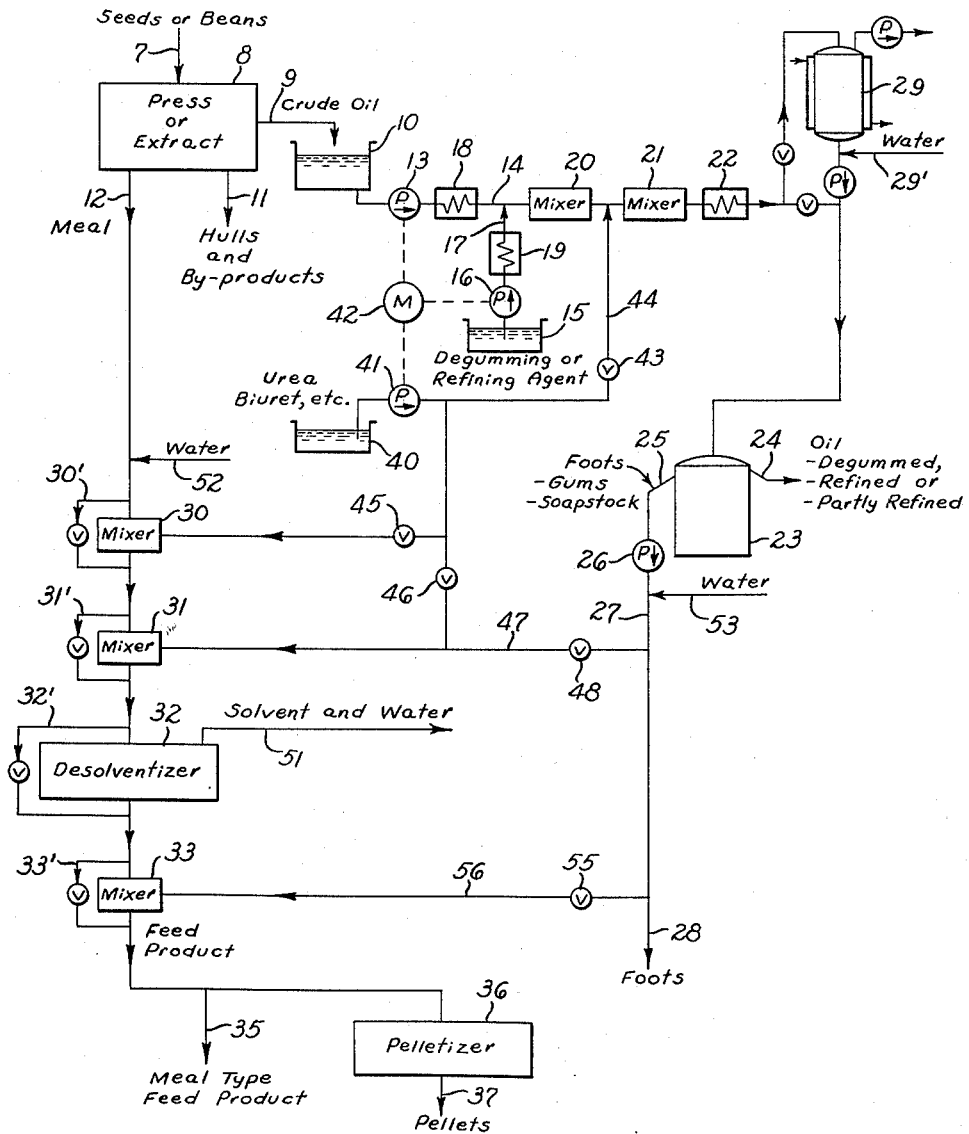

2,958,600

ANIMAL FEEDS AND METHODS OF PRODUCING SAME

Benjamin H. Thurman, New York, N.Y., assignor to Benjamin Clayton, doing business as Refining, Unincorporated, a sole proprietorship Filed Nov. 23, 1956, Ser. No. 623,929

16 Claims. (Cl. 99—2)

This invention relates to animal feeds and to methods of producing them. More particularly, the invention is concerned with the detoxification of cottonseed meals in the presence of an amide-radical compound, typically an amide of an organic acid such as urea or biuret; also with feed products in which are present both such amide-radical compound and foots separated during the degumming or alkaline refining of a crude vegetable oil, the foots being either the gum-containing foots obtained when degumming a crude glyceride oil or the gum-containing soapstock obtained when alkali refining or treating such an oil.

Cottonseed meals or foots usually contain free gossypol in amount sufficient to be toxic to certain animals. In feeds of general utility, the free gossypol content should ordinarily not exceed 0.1% and lower contents are desirable. It has been previously proposed to detoxify cottonseed meals by heating same to high temperatures for prolonged periods. It has been currently found that detoxification of cottonseed meals can be effected at lower temperatures and/or at faster rates if a small amount of an amide-radical compound such as urea or biuret is present during the heating. It is an object of the present invention to detoxify cottonseed meals and animal feed products by heating in the presence of a small amount of an amide-radical compound.

The detoxification of cottonseed meals is often facilitated by the presence of a small amount of gum-containing foots but it has also been found that detoxification becomes possible at even lower temperatures and/or shorter application periods if there is also present an amide-radical compound added to the meal with or before the foots. It is an object of the present invention to process mixtures of cottonseed meal, foots and an amide-radical compound by heating to detoxifying temperatures less than those that would be necessary in the absence of the amide-radical compound.

The rumen fluid in the stomach of ruminant animals, typically cattle, sheep and goats, is capable of converting small amounts of urea and other amide-radical compounds into protein nitrogen. In these quadripartite-stomach animals, the rumen fluid in the influent stomach compartments is teeming with micro-organisms or bacterial acting to ferment the feed. In the presence of other feed essentials such as carbohydrates, vitamins, minerals, etc., the micro-organisms or bacteria convert urea to amino acids and proteins but are, in turn, digested by the animal itself in a more advanced position in the intestinal tract. The presence of a small amount of urea is thus desirable from its known ability to be converted to protein nitrogen. If the degree of conversion could be increased, the benefits of a small amount of urea or other amide-radical compounds would be increased.

It has now been found that the joint presence in the feed of foots separated from crude vegetable oils and an amide-radical compound such as urea or biuret will result in a very substantial increase in this conversion of urea to protein nitrogen, with many beneficial results to the ruminant animals. It is an object of the invention to provide a feed for ruminant animals including both amide-radical compounds and foots separated from a crude glyceride oil, namely gums or soapstocks containing such gums.

A particularly desirable feed product or concentrate is formed by the addition of such soapstocks to the by-product meal resulting when crude glyceride oils are obtained from the source material, e.g. seeds or beans, by use of solvents, pressing or both. Not only are the aforesaid soapstocks a cheap and excellent source of fat for fat-deficient meals resulting from modern solvent extraction processes, but they also serve to prevent dusting, improve the pelleting properties, and generally improve the meal as an animal feed product. It is an object of the invention to provide such a feed product and a process of producing same.

Particular advantages, both economic and nutritive, result from the return of the foots or soapstock to indigenous meals, by which I have reference to meals from the same source material as the oil from which the foots or soapstocks have been separated. It has now been found, however, that small amounts of urea or biuret in such meal-foots mixtures greatly enhance the value thereof and the growth-increasing ability in ruminant animals. It is an object of the present invention to process seeds or beans to produce a crude oil and a meal, the oil being processed to separate foots therefrom, these foots being returned in whole or in part to the meal, a small amount of an amide-radical compound being also added in the process to be present in the meal-foots mixture.

Other objects and advantages of the above-discussed processes will be apparent from the following amplified discussions thereof and from the later discussed drawing illustrating equipment that can be used in the practice of any of the processes of the invention. First, however, general discussions of components useful in the process will be presented.

In this connection, the amide-radical compounds with which the invention is concerned are those containing at least one amide radical ($NH_2$). Typically amides of organic acids are suitable, such as urea, biuret, acetamide, propionamide, succinamide, salicylamide, etc.

The foots with which this invention is concerned are those gum-containing foots separated from crude glyceride oils in the degumming, refining, or partial refining thereof. The gums contain lecithin and other products native to crude glyceride oils and are apparently the fruitful agents in the process. Such gums can be separated from the oil centrifugally or by settling, after precipitation by water or dilute alkaline or acidic degumming agents in the known degumming processes. Such gums are also present in substantially nondegraded form in certain alkali soapstocks separated from the oil after mixing therewith an alkali in sufficient amount to react with at least some of the free fatty acids of the oil. Soapstocks resulting from such processing of crude glyceride oils by use of non-saponifying alkalis, typically soda ash, ammonia, etc., are particularly effective in increasing the conversion of urea to protein nitrogen. This is probably because these alkalis do not degrade the gums, which appear as a component of the separated soapstock in substantially their original form. However, other saponifying-type alkalis can sometimes be used to produce soapstocks beneficial in the process, particularly if used in conjunction with non-saponifying alkalis or if used in such limited amounts as not to destroy the gums, producing substantially nondegraded gums as a part of the soapstock. Regardless of how produced, the soapstocks desirably used in the process are substantially completely soluble in petroleum ether. The term "foots" at herein used is intended to include such gums separated from crude glyceride oils in a degumming operation or such soapstock separated from such oils in the alkaline treatment thereof and containing gums in substantially nondegraded form.

The utilization of a small amount of urea or other amide-radical compound in detoxifying cottonseed meal is of importance not only because the detoxification can be effected at lower temperatures but also because the resulting meal has a higher protein rating as a result of the amide-radical compound it contains. Pure urea contains 46.67% nitrogen, the usually-used feed grades containing 41.9% thereof. Adding 1.0% of commercial urea will increase the protein rating of the meal by 2.62%. As an example of a high-protein meal, a 50% protein cottonseed meal can be produced by adding 4 parts of urea to 96 parts of 41% protein cottonseed meal. This yields a 50% protein meal that is detoxified when part or all of the urea is added to the meal in the usual desolventizer.

Excessive amounts of urea are to be avoided in cattle feeds and it is desirable that not more than one-third of the nitrogen should be supplied by urea or amide-radical compounds. However, if a steer ate as much as four pounds of cottonseed meal a day that had been detoxified by use of 1.0% urea, this would represent a consumption of 0.04 pounds of urea, which is well below the level of toxicity.

In general, while amounts of amide-radical compounds larger than necessary to aid detoxification are of little benefit on this score, they may be used in nontoxic amounts as a source of protein nitrogen without departing from the spirit of the present invention. Likewise, detoxification can be aided in accordance with the invention without significant increase in protein content, if this is desired. For example, a cottonseed meal normal in all respects except as to having an outstandingly low free gossypol content can be produced by adding only a fraction of a percent of urea to the meal within or ahead of the desolventizer. Thus, the addition of 0.125% of urea can reduce the gossypol content of the desolventized meal to less than .1% while increasing the protein content by only 0.33% if this is desired.

The urea or other amide-radical compound can be added in the process at various stages. All or a portion may be added in aqueous solution as a degumming or refining agent or as an aid thereto. In this event it will be added to the crude oil before separation of the gums or soapstock and will appear as urea or gum-urea complexes in the separated gums or soapstock when heated for detoxification or when returned to the meal, if this alternative is used. As a degumming agent, it has been found that urea reduces the residual phosphatides in the degummed oil to a degree greater than water alone. Thus, degumming a crude cottonseed oil by 3% water produced degummed oil containing .31% phosphatides while degumming with 3% of a 5% urea solution produced an oil containing only .21% phosphatides. Urea solutions of 2–20% concentration, preferably 5–10%, are quite practical as degumming agents, particularly if about 1.5–3% thereof are used. In some instances a more concentrated solution can be used, followed by mixing additional water with the oil-urea system. In general, urea or other amide-radical compound added as a part of the degumming or refining agent also betters the centrifugal separation, acting as a weighting agent for the foots and as a de-emulsifying agent aiding in reducing the free oil carried over with the soapstock.

Alternatively or in addition, the urea or other amide-radical compound can be added to the separated gums or soapstock or directly to the meal. In many instances where the joint presence of gums or soapstock and amide-radical compound is desired, it is preferred to add the compound to the meal before the gums or soapstock are added, particularly when processing cottonseed meal to effect detoxification. In some instances, if the amide-radical compound is first mixed with the foots and the mixture added to the meal followed by heating to the extent mentioned above, little or no detoxification of cottonseed meal or cottonseed foots will result. However, if the same amount of the amide-radical compound is first mixed with the meal and the foots added, the same heating will effectively detoxify the meal. For example, mixing 0.5% urea dissolved in 20% water with a solvent-extracted cottonseed meal containing .50% free gossypol, then adding 3.0% soda ash cottonseed soapstock, dry basis, dispersed in 15% water, then heating to 107–110° C. for 30 minutes, reduced the gossypol of the treated meal mixture to 0.041%. In another instance a solvent-extracted cottonseed meal having 0.58% free gossypol was mixed at room temperature with .5% urea dissolved in 20% water. Soda ash cottonseed soapstock, 3.0% dry basis, was dispersed in 15% water and mixed with the meal-urea solution after which the whole was heated to 107–110° C. for 30 minutes. The resulting meal contained .021% free gossypol, a reduction of 96%. There is sometimes an antagonism between urea and soapstock in respect to detoxification, but mixing the meal with the urea before adding the soapstock will eliminate or overcome such antagonism.

As to detoxifying temperatures, these will ordinarily be in the range of 85–120° C. and will be applied for a period ranging from about several minutes or more at the higher temperatures of the range to about 30–120 minutes at the lower temperatures of the range, if small amounts of urea or other amide-radical compounds are present. The presence of about .25–2.5% of urea, sometimes as low as .125% will be found to be effective. Temperatures of 85–110° C., usually 100–110° C., applied for 20–40 minutes, typically 30 minutes, are commonly employed and, with the small amounts of urea mentioned above, will reduce gossypol contents of meal or meal-foots mixtures from .5% or more to values well below .1% usually to .03–.07%.

It is often desirable to effect the detoxifying heating in the presence of added water. The addition to the meal, to the foots or to the meal-foots mixture of about 10–50% water, by weight, typically 20%, will benefit the process, render the product more fluid and facilitate mixing and uniform heating. The amide-radical compound may be mixed with or dissolved in a part or all of this amount of water before being added to the meal product or before being used in the degumming or refining process which produces the foots. In other instances all or most of the water may be separately added to the meal or to foots if the latter are to be added thereto, as will be described. Heating of the cottonseed meal in the presence of water alone, in the absence of amide-radical compounds or soapstocks, will reduce the free gossypol much less than when such materials are present. In the latter instance, reductions to below 0.1 or 0.15% are easily effected.

An example of detoxifying a cottonseed meal at quite low temperatures is as follows. A solvent extracted cottonseed meal was mixed with 20% of water containing 0.5% of urea, the mixture being then heated at a temperature of 87–90° C. for 30 minutes. The amount of free gossypol was reduced from 0.37% before the treatment to 0.04% after the treatment. The presence of the urea made detoxification possible at temperatures much lower than would have been needed in the absence of the urea.

As examples of detoxifying extracted cottonseed meals at somewhat higher temperatures, the following table gives results in using various amide-radical compounds dissolved in the designated amount of water, amounts being based on the weight of the meal, the mixture in each case being heated to 107–110° C. for 30 minutes.

| Meal No. | Additive | Free Gossypol Content | |
|---|---|---|---|
| | | Untreated Meal, percent | Treated Meal, percent |
| 8151 | 2.5% biuret in 20% H$_2$O | .43 | 0.054 |
| 8151 | 2.5 urea in 20% H$_2$O | .43 | 0.076 |
| 8151 | 1.0% urea in 20% H$_2$O | .43 | 0.070 |
| 8151 | .5% urea in 20% H$_2$O | .43 | 0.033 |
| 8149 | .5% urea in 20% H$_2$O | .50 | 0.032 |
| 8149 | .25% urea in 20% H$_2$O | .50 | 0.032 |
| 7659 | .49% acetamide in 20% H$_2$O | .37 | 0.080 |
| 7659 | .61% propionamide in 20% H$_2$O | .37 | 0.078 |
| 7659 | 1.19% salicylamide in 20% H$_2$O | .37 | 0.061 |

In those processes in which the meal is dried or desolventized, the temperatures in the related equipment and the time of dwell therein are usually sufficient to effect detoxification of cottonseed products in the presence of an amide-radical compound. For example, the process is particularly well adapted to detoxification of cottonseed meals resulting from the solvent extraction of oil from the seed. The resulting meal is normally passed through a desolventizer where its temperature is progressively raised to a value that is usually somewhat above 100° C. and usually sufficient to effect the desired detoxification if the amide-radical compound is present. Thus, detoxification can become an incident of present processes and equipment or can be effected by appropriate adjustment of temperatures in the desolventizer to be substantially in the range of 100–120° C.

There are many advantages in the joint presence in feeds of an amide-radical compound and foots separated from crude vegetable oil, e.g. gums or gum-containing soapstock. In detoxifying cottonseed meals in the presence of urea, biuret or other amide-radical compounds, the presence of a small amount of such foots often benefits the process and produces a superior feed product. Quite aside from the detoxification of cottonseed products, the joint presence of an amide-radical compound and a small amount of foots greatly improves the feed product and it is of great economic advantage to return to the vegetable oil meal the foots separated in the degumming or refining of the oil from the same source material. It is usually desirable to return to the meal all of the indigenous foots, whether in the form of separated gums or soapstocks, but lesser amounts can be returned. As the percentage of foots in the feed product may vary from a fraction of a percent up to ten percent or somewhat higher, it is sometimes desirable to supplement the indigenous foots with non-indigenous gums or soapstocks. On most oils, the indigenous soapstock would represent no more than about 2% of the weight of the meal, if returned thereto.

Gum-containing alkaline soapstocks are particularly advantageous in meal-type feed products. Not only is the volume of soapstock available for return to the meal greater than the volume of gums, but also such soapstocks usually contain a small amount of free alkali which combines with some of the protein in the meal to form complexes that are more soluble in water and stomach fluids and more easily digested than the protein that is not so combined. The resulting feed product when ingested by cattle will disperse quickly in the stomach or paunch, the soapstock reducing the surface tension of the rumen fluid and serving to keep the meal and other ingredients suspended so that digestion proceeds uniformly. The condition known as "bloat," in which the feed products sink to the bottom of the stomach and gas accumulates on top thereby choking the animal, is avoided or substantially reduced. Importantly, also, the feed product is markedly improved in its dusting and pelleting qualities and in its nutritive value by the presence of small amounts of soapstock. By way of example, solvent extracted cottonseed meal is converted from a dusting, non-pelleting, whitish, nutritionally-deficient meal to a non-dusting, readily pelletizable, desirably yellow-colored, high grade, nutritionally enhanced meal by the addition of minor amounts of alkali soapstocks to be present with the amide-radical compound.

The increase in nutritive and growth-stimulating properties of feeds containing both an amide-radical compound and foots, e.g. gums or soapstocks, separated from a crude glyceride oil is undoubtedly influenced by the fact that the presence of the gums or gum-containing soapstock increases the conversion of the urea or other amide-radical compound to protein nitrogen. Tests of the in vitro type, for example with rumen fluid from a fistulated steer, show a reduction in protein concentration upon incubation as concerns meal-type feeds containing the soapstock alone, but a marked increase as to feeds containing both soapstock and urea.

By way of example, in one series of such tests, the control alone (buffered rumen fluid) produced a decrease in protein concentration upon incubation of minus 55 micrograms per ml. Soapstock solutions were made up by dispersing 2.724 grams, net weight, of soyabean and detoxified cottonseed soapstock, respectively, in 100 ml. of distilled water. When using the control plus 0.5 ml. of the soyabean soapstock solution there was a decrease in protein concentration upon incubation to minus 105 micrograms per ml. When using the control plus 0.05 gm. of urea plus 0.5 ml. of the soyabean soapstock solution, the protein concentration increased to plus 480 micrograms per ml. When using the control and the same amount of urea but an increased amount of the soyabean soapstock solution, i.e., to 1.0 ml., the increase was plus 815. Similar tests using the detoxified cottonseed soapstock solution gave related results. With the control plus 0.5 ml. of this solution, the protein concentration upon incubation was minus 75 micrograms per ml. When using the control plus the same amount of the detoxified soapstock solution but also with urea in the respective amounts of 0.5 and 1.0 gms., the protein concentrations were respectively increased to plus 510 and plus 610 micrograms per ml.

The drawing shows a pipeline diagram of apparatus capable of carrying out the processes and producing the feed products of the invention.

Referring to the drawing, the seeds or beans, constituting the source material, are indicated by the arrow 7 as being delivered to an apparatus 8 producing, by pressing, solvent extraction or both, crude oil 9 supplied to a container 10; also hulls and by-products 11, and meal designated by the numeral 12. A stream of the oil is delivered by a proportioning pump 13 to a line 14.

The degumming agent, typically water or a weak acidic or alkaline solution, or the refining agent, typically an aqueous alkaline solution, e.g., a 20° Bé. soda ash solution, is withdrawn from a container 15 by a proportioning pump 16 and delivered to the line 14 through a line 17. The oil and the degumming or refining agent may, if desired, be preliminarily heated in the respective containers 10 and 15 or in heat exchangers 18 and 19 in the lines 14 and 17.

The preliminary mixed stream may flow from the junction of lines 14 and 17 to mixers 20 and 21 and thence through a heat exchanger 22 to a separating means shown as a centrifuge 23 from which the degummed, refined, or partially refined oil is continuously discharged through a spout 24 and from which the foots are continuously discharged through a spout 25. Separation will usually be at superatmospheric temperature, typically about 180–210° F., the heat being supplied before mixing, as mentioned above, or in the heat exchanger 22. The separated foots may be pressured by a pump 26 and delivered to a pipe 27 from which they may discharge at 28 or from which all or a portion of the foots may be withdrawn for return to the meal, as will be described. In instances where the oil-foots mixture is to be degasified or dehydrated and rehydrated before separation of the foots takes place in the centrifuge, the mixture may be by-passed to a jacketed degasifier or vapor-separating chamber 29 beyond which additional water may be added as at 29'. Such a sequence is often desirable to separate the carbon dioxide that forms when soda ash is used as a refining agent in insufficient excess to suppress the evolution of carbon dioxide in the mixture.

The meal 12 is shown as passing sequentially through mixers 30 and 31, a desolventizer 32 and a mixer 33, respectively equipped with valved by-passes indicated by corresponding primed numerals. The effluent feed product from the mixer 33 may discharge through a line 35 as a meal-type product or may be delivered to a pelletizer 36 and be discharged therefrom as pellets 37.

The amide-radical compound, preferably in aqueous solution, is retained in a container 40 and withdrawn therefrom by a proportioning pump 41. The pumps 13, 16 and 41 may be driven at related speeds from a single motor 42 or may otherwise be driven to produce streams of related volume.

In instances in which the amide-radical compound is to be used as the degumming agent or the refining agent or as an aid to either, a valve 43 may be opened in a line 44 to deliver the solution to any suitable part of the apparatus ahead of the separator 23, typically to the line 14 at a position between the mixers 20 and 21. If the solution is to be delivered to the meal, opening of a valve 45 will deliver it to the mixer 30. If the solution is to be delivered to the separated foots before the latter are mixed with the meal, a valve 46 may be opened to deliver the solution to a line 47 through which the separated foots flow upon opening of a valve 48, the initially mixed solution and foots then advancing along the line 47 to the mixer 31. In this instance, the valved by-pass 30' may be opened to exclude the mixer 30 from the system. Alternatively, a portion of the solution may be discharged into the mixer 30 and another portion discharged into the foots advancing in the line 47 and thus being later delivered to the meal in the mixer 31.

The meal mixture advances slowly through the desolventizer 32 which may be of conventional construction and which heats the meal to temperatures which are preferably in the range of about 100–120° C. although lower temperatures can be used, particularly if no substantial amount of solvent is present or to be removed. Vapors of the solvent, if present, and water will be removed from the desolventizer, as indicated by the numeral 51. The solvent will be residual solvent present in the meal because of solvent extraction of the crude oil in the apparatus 8. The water will be present in the meal from any one of a number of sources. Thus, the initial meal 12 usually contains some water. If not, it is often desirable to add water either in the apparatus 8 or as indicated by the numeral 52. If some or all of the separated foots are returned to the meal, these foots may contain substantial amounts of water either from the solutions in the container 15 or 40 or because of the addition of water to the foots as indicated by the numeral 53.

If the foots are to be returned to the meal, this is preferably done at a position ahead of the desolventizer 32, particularly in processes requiring detoxification. On the other hand, all or a part of the separated foots can be delivered, if desired, to the mixer 33 beyond the desolventizer by opening a valve 55 in a line 56. Except in such instances it is usually unnecessary to use the mixer 33, particularly if the feed product from the desolventizer is sold as an article of commerce or is sent to the pelletizer 36. In such instances, the mixer 33 can be omitted or by-passed by the means 33' shown.

The usual desolventizer 32 provides means for agitating the meal during the heating thereof, thus facilitating uniform vaporization. Conventional desolventizers provide, or can be easily adjusted to provide, sufficient dwell time to insure that the effluent feed product is adequately detoxified. In instances where detoxification is not required, as when processing soya meals or other meals substantially free of gossypol, the desolventizer 32 can be by-passed or can serve its conventional function of removing water and also residual solvent, if present. In such instance, all or a part of the separated foots can be returned to the meal in the mixer 33, being there mixed with the meal which already contains the amideradical compound.

All of the aforesaid equipment will desirably be installed at the oil extraction mill. This not only insures processing of a relatively fresh meal, a factor adding detoxification, but also makes possible a unitary operation in which two low-value products can be economically brought together to produce a valuable feed product. In addition, the oil in the line 24 may be sold for premium prices even if it is not completely refined.

Distinctly advantageous results arise from the production and use of low excess soda ash soapstocks in the process. Thus, this non-saponifying neutralizing agent may be mixed with the oil in amount not substantially in excess of three times the amount necessary to neutralize the free fatty acids of the oil and preferably in amount ranging from a fraction of that required to neutralize up to about twice that required to neutralize. In this connection, the soda ash will desirably be added as an aqueous solution of about 16–30° Bé. The resulting foots or soapstocks are water dispersible and substantially completely soluble in petroleum ether. They are of low moisture content, usually containing less than 45% and often less than 35% water. They contain the phosphatidic complexes of the crude oil essentially in their original form. Additionally, the low excess soda ash soapstocks are stable and nonfermenting. They contain a small amount of free alkali sufficient in quantity to increase the surface-active properties of the phosphatidic complexes but insufficient to influence materially the inorganic salt content of the meal when mixed therewith and insufficient to make the meal unpalatable or unsuited for use in feeds. With this type of soapstock, the amount of free alkali may be about 1–10%, typically about 2–5% by weight. Depending upon the excess soda ash used in the process and the operating conditions employed, a minor or major part of this small fraction of free alkali may be sodium bicarbonate. The oil content of such low excess soda ash soapstock may range from about 12% to about 25% and will increase the assayable "fat" content of the feed.

Cottonseed meals processed in accordance with the invention and containing 0.25–0.50% urea, with or without indigenous soda ash soapstock, can be employed as a part of a wide variety of animal feeds. By way of example, typical steer formulas are as follows: Ground peanut hulls—40%, yellow ear corn—50%, and the aforesaid cottonseed meal—10%. Ground ear corn—60%, ground alfalfa hay—15%, ground orchard grass hay—15%, and the aforesaid cottonseed meal—10%. The cottonseed meal in the aforesaid two examples will typically contain 0.50% urea. Typical of a steer feed formula using cottonseed meal containing 0.25% urea is one having the following composition, to-wit, cottonseed hulls—26.5%, milo grain—50.0%, cottonseed meal—7.5%, dehydrated alfalfa meal—5.0%, cane molasses—10.0%, calcium carbonate—0.5%, and salt—0.5%.

A composite example of the steps employed in the invention in producing the meal-type feed product, such as the cottonseed meal mentioned above, is as follows, considering treatment of a solvent-extracted West Texas crude cottonseed oil containing 1.9% free fatty acids, 0.60% free gossypol and having a Wesson loss of 3.71%. This oil can be refined with 4.8% of 20° Bé. soda ash solution, an amount substantially equal to twice the amount required to neutralize the free fatty acids. The crude oil may be preheated in the heater 18 to 140° F. before adding the soda ash solution, the resulting mixture being further heated in the heat exchanger 22 to about 190° F., before introduction into the degasifier 29, which may be operated under a vacuum of about two inches of mercury. The carbon dioxide but little or none of the water is removed in this step and usually no additional water need be added at 29'.

The mixture is withdrawn from the degasifier 29 by a pump and separated in the centrifuge 23. The soda ash soapstock discharging through the spout 25 will contain about 18% free oil, dry basis, and 9.0% free gossypol, dry basis. The refined oil issuing from the spout 24 may be cooled and re-refined with 2.0% of 32° Bé. caustic soda, the mixture being reheated to about 150° F. and centrifugally separated in the presence of about 20% added water.

A solution of urea, 0.5% urea dissolved in 5.0% water (percentages based on the weight of the final desolventized meal), can be pumped from the tank 40 to the mixer 30, being there mixed with the meal from which the crude oil was extracted. The soda ash soapstock, mixed with 10% water added at 53 (based on the weight of the final desolventized meal), can be added to the urea-meal mixture in the mixer 31 or directly in the desolventizer 32, e.g. after the urea-meal mixture has been mixed for a period of about 15 minutes or longer, the desolventizer operating at conventional temperatures required to remove the solvent. The resulting desolventized meal will assay about 2.8% oil and 0.08% free gossypol. About 1.0% of this oil will be a residual oil in the meal and about 1.7% will be from the soda ash soapstock, the phosphatides of which are petroleum ether soluble. The meal without the urea and soapstock additives will assay, before treatment, about 1.0% fat and 0.35% free gossypol.

If such a meal is treated only with the urea solution, as above, but without the addition of soapstock, the resulting detoxified meal will assay about 0.03% free gossypol or lower. The low fat content of such a detoxified meal can be increased by mixing therewith other oil or fat additives, if desired. However, the use of gums or gum-containing soapstocks to fortify the fat content is particularly desirable in view of the low cost of these materials and the other advantages arising therefrom.

Various changes can be made without departing from the spirit of the invention as defined in the appended claims.

I claim as my invention:

1. A process for the detoxification of a cottonseed product to reduce the free gossypol therein, which process includes the steps of: incorporating into said cottonseed product about .1–3% of an amide-radical compound; and detoxifying the resulting product by heating same to a temperature of about 85–120° C.

2. A process for the production of a detoxified cottonseed meal low in free gossypol, which process includes the steps of: processing cottonseed to produce a meal undesirably high in free gossypol; and heating said meal to a detoxifying temperature of about 85–120° C. in the presence of not more than a few percent of an amide-radical compound, the amount of such compound being at least about .1%.

3. A process for the detoxification of a cottonseed meal product to reduce its content of free gossypol, which process includes the steps of: incorporating into said meal product about .1–3% of an amide-radical compound selected from the group consisting of urea and biuret; and heating the resulting meal product to a temperature of about 85–120° C. for a period ranging from several minutes to two hours.

4. In a process in which a crude gum-containing cottonseed oil is extracted from cottonseed with the aid of a solvent and in which solvent is evaporated from the residual meal by heating in a desolventizer, the improvement whereby the meal is detoxified in said desolventizer and while subjected to the desolventizing temperatures therein, said improvement including incorporating into said meal to be present admixed therewith in said desolventizer about .1–3% of an amide-radical compound, and heating the admixed meal and amide-radical compound to a temperature of about 85–120° C. in the desolventizer.

5. In the process in which a crude gum-containing cottonseed oil is extracted from cottonseed with the aid of a solvent and in which solvent is evaporated from the residual meal by heating in a desolventizer, the improvement whereby the meal is detoxified in said desolventizer while subjected to the desolventizing temperatures therein, said improvement including incorporating into said meal to be present therewith in said desolventizer a small amount, ranging upward from about .1% but not to exceed several percent by weight, of an amide-radical compound and about 10–50% water, and heating said meal and its amide-radical compound in said desolventizer to a temperature of about 85–120° C., the temperature in said desolventizer evaporating at least a part of said water.

6. In the process in which a crude gum-containing cottonseed oil is extracted from cottonseed with the aid of a solvent and in which solvent is evaporated from the residual meal by heating in a desolventizer, the improvement whereby the meal is detoxified in said desolventizer while subjected to the desolventizing temperatures therein, said improvement including incorporating into said meal to be present therewith in said desolventizer a small amount ranging from about .1% to about 3% of an amide-radical compound and from a fraction of a percent up to about 10% of a material increasing the conversion of said compound to protein nitrogen in the stomach of ruminant animals, said material comprising at least a part of the gum-containing foots separated from said crude oil, and heating the meal, its amide-radical compound and said material to a temperature of about 85–120° C. in said desolventizer.

7. In the process in which a crude gum-containing cottonseed oil is extracted from cottonseed with the aid of a solvent and in which solvent is evaporated from the residual meal by heating in a desolventizer, the improvement whereby the meal is detoxified in said desolventizer while subjected to the desolventizing temperatures therein, said improvement including the steps of: precipitating in and separating from said oil gum-containing foots; incorporating into said meal to be present therein in said desolventizer a small amount, ranging upward from about .1% but not to exceed several percent by weight, of an amide-radical compound and an amount of said separated foots ranging from a fraction of a percent to about 10%; and heating the meal and its amide-radical compound to a temperature of about 85–120° C. in said desolventizer.

8. In the process in which a crude gum-containing cottonseed oil is extracted from cottonseed with the aid of a solvent and in which solvent is evaporated from the residual meal by heating in a desolventizer, the improvement whereby the meal is detoxified in said desolventizer while subjected to the desolventizing temperatures therein, said improvement including the steps of: precipitating in and separating from said oil gum-containing foots; and incorporating into said meal to be present therein in said desolventizer a small amount, ranging from about .1–3% by weight, of an amide-radical compound, about 10–50% water, and at least a part of said separated foots, and heating the meal containing such water and such amide-radical compound to a temperature of about 85–120° C. in said desolventizer.

9. A process for improving the nutritive value of vegetable oil meals and for otherwise improving same as a feed product for ruminant animals, which process includes the steps of: adding to said meal about .1–3% of an amide-radical compound and a material increasing the conversion of such compound into protein nitrogen in the stomach of ruminant animals, said material comprising from a fraction of a percent up to 10% of gum-containing foots separated from a crude vegetable oil, said gum-containing foots being substantially completely soluble in petroleum ether, the gums of said foots being substantially free of alkali degradation.

10. A process for producing a feed product, which process includes the steps of: mixing with a crude glyceride oil containing gums and free fatty acids a sufficient amount of an alkaline agent and water to precipitate said gums and react at least some of said free fatty acids to produce separable gum-containing foots including soaps resulting from said reaction; separating said foots from the oil, the separated gum-containing foots being substantially completely soluble in petroleum ether; and mixing with a meal-type animal feed about .1–3% of an amide-radical compound and at least a portion of said foots thus separated from the oil, the amount of said foots ranging from a fraction of a percent up to about 10%.

11. A process for producing a feed product, which process includes the steps of: mixing with a crude glyceride oil containing gums and free fatty acids a sufficient amount of an alkaline agent and water to precipitate said gums and react at least some of said free fatty acids to produce gum-containing foots including soaps resulting from said reaction; separating said foots from the oil, the separated gum-containing foots being substantially completely soluble in petroleum ether; mixing with a meal-type animal feed comprising cottonseed meal containing free gossypol about .1–3% of an amide-radical compound and then at least a portion of said foots thus separated from the oil, the amount of said foots ranging from a fraction of a percent up to about 10%; and heating the mixture of feed, amide-radical compound and foots to a detoxifying temperature of about 85–120° C.

12. The process as defined in claim 10 in which the resulting feed mixture contains water, and including the step of heating such feed mixture to a temperature of about 100–110° C., at least some of said water being removed during such heating.

13. The process as defined in claim 10 in which said alkali is a non-saponifying alkali and in which said gums are present in substantially nondegraded form in said foots.

14. A process for producing a feed product and a partially refined oil from a glyceride-oil source material such as seeds and beans, which process includes the steps of: processing said source material to produce a meal and a crude glyceride oil containing gums and free fatty acids; mixing with the oil sufficient alkali and water to precipitate the gums and react with at least a part of said free fatty acids to produce soaps; separating soapstock from the oil while containing said gums and soaps, the separated soapstock being substantially completely soluble in petroleum ether; and adding to said meal about .1–3% of an amide-radical compound and at least a portion of said separated soapstock, the amount of said separated soapstock ranging from a fraction of a percent up to about 10%.

15. The animal feed product for ruminant animals produced by the process of claim 9.

16. The feed product produced by the process of claim 10.

References Cited in the file of this patent

UNITED STATES PATENTS

| | | |
|---|---|---|
| 1,553,634 | Sawyer | Sept. 15, 1925 |
| 2,686,794 | Clayton | Aug. 17, 1954 |
| 2,687,354 | Gribbins | Aug. 24, 1954 |
| 2,746,864 | Pack et al. | May 22, 1956 |
| 2,797,997 | Eagle et al. | July 2, 1957 |

OTHER REFERENCES

Pack et al.: Jour. Am. Oil Chem. Soc., November 1955, vol. 32, pp. 551–3.

UNITED STATES PATENT OFFICE

CERTIFICATE OF CORRECTION

Patent No. 2,958,600 November 1, 1960

Benjamin H. Thurman

It is hereby certified that error appears in the printed specification of the above numbered patent requiring correction and that the said Letters Patent should read as corrected below.

Column 3, line 4, for "at" read -- as --; column 8, line 16, for "adding" read -- aiding --.

Signed and sealed this 25th day of April 1961.

(SEAL)
Attest:
ERNEST W. SWIDER
Attesting Officer

DAVID L. LADD
Commissioner of Patents